Figure 1:
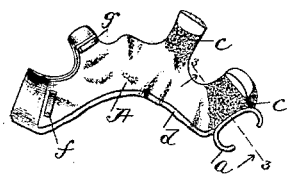
Figure 2:
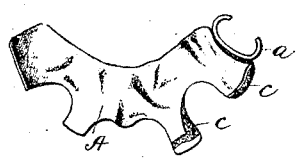

(No Model.)

J. J. STEDMAN.
DENTAL PLATE.

No. 422,165. Patented Feb. 25, 1890.

Witnesses.
Wm. M. Rheem.
J. R. Andrews.

Inventor.
John J. Stedman
By Prince Fisher
His Attys.

UNITED STATES PATENT OFFICE.

JOHN J. STEDMAN, OF LA PORTE, INDIANA.

DENTAL PLATE.

SPECIFICATION forming part of Letters Patent No. 422,165, dated February 25, 1890.

Application filed November 23, 1889. Serial No. 331,307. (No model.)

*To all whom it may concern:*

Be it known that I, JOHN J. STEDMAN, of the city and county of La Porte, State of Indiana, have invented certain new and useful Improvements in Dental Plates, of which the following is hereby declared to be a full, clear, and exact description, sufficient to enable others skilled in the art to which said invention appertains to make and use the same.

The invention relates to the manufacture of partial dentures having a metal base, and is directed more especially to the preparation of such dentures wherein the base-plate is comparatively narrow and clasps or stays are used to retain the plate in position.

In making partial dentures with bases of gold, silver, platinum, &c., it is a common practice to form and shape the base-plate at the outset by separate impression, (with the use of dies, &c., as well understood,) the clasps being fitted to the teeth of the counter-model and soldered to the prepared plate while the latter is mounted in place upon such model.

The difficulty in securing accuracy of fit and in properly joining the clasps to the plate has long been recognized by the profession. To obviate the trouble it has heretofore been proposed to adjust the base-plate (already shaped by separate impression) in place within the mouth of the patient, and to fit the clasps about the teeth, which were to serve eventually to sustain them. With the base-plate and clasps *in situ* a try-plate impression in wax was then taken, and after all were separately removed the base-plate and clasps were again restored to position upon the impression and the whole covered with plaster composition, which upon setting and parting served as a mount to sustain the parts while the clasps were being soldered to the base. By such practice the clasps were directly fitted in the mouth to the teeth they were designed to embrace. The imperfections in fit and risks of breakage were thus avoided, which must ordinarily arise were attempt made to shape the clasps about the teeth of the model. On the other hand, the try-plate impression, being in wax, was apt to become distorted; but much more objectionable, the soldering of the clasps to the base-plate on the counter-model is almost certain to be inaccurate. The slightest change in proper position of the clasps, even such as may be due to any strain in the setting of the solder, develops "windage" and gives rise to much discomfort. Oftentimes the patient must abandon the use of the plate altogether.

The practical difficulties in manufacture above outlined and the discomforts thence apt to ensue in the use of partial dentures having metal base-plates with clasps to retain the same have very greatly diminished the use of such dentures, although it is fully recognized that when properly made these are far preferable to the wider plates (metal or vulcanite) which depend upon suction only for support in the mouth.

It is the purpose of the present invention to secure, by the use of a metal base in connection with the retaining-clasps, an improved construction of partial dentures which is not only light and easily worn, but by reason of the mode of manufacture shall be of superior merit because of the exceeding nicety of fit rendered possible thereby.

Figure 3:
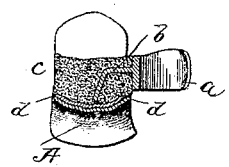
Figure 5:
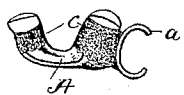
Figure 6:
Figure 4:
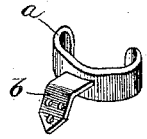

Figures 1 and 2 and 5 and 6 are obverse and reverse views of partial dentures constructed in accordance with my invention. Fig. 3 is a partial view in section on line 3 3 of Fig. 1. Fig. 4 is a detail view, in perspective, of the clasp and its stay or anchor.

At the outset the clasps $a$, used to retain the base-plate, are fitted accurately upon the teeth as they stand in the mouth by means of pliers or like expedient. This manipulation resembles the bending of the clasps about the teeth of a counter-model as commonly practiced heretofore in the preparation of partial dentures having metal plates. The clasps are generally made from gold plate, No. 23 or 24 standard gage, and (most conveniently) after being properly fitted are furnished on their lingual side with gold stays or anchors, as at $b$, projecting therefrom, and which, when fastened to the base-plate, securely retain the clasps thereon. The stays $b$ may be perforated at several points (and the holes countersunk, if desired) to admit the flow of soft rubber through the perforations to more rigidly fasten the stays in position. The stays $b$ are ordinarily soldered to the clasps $a$, and may be so fastened before the clasps are fitted to the teeth, although for greater accuracy of arrangement it is desirable to secure them to the clasps subsequently.

The previously-prepared base-plate being placed within the mouth of the patient and the clasps set in position about the teeth by which they are to be retained, a coating of wax is applied to both sides of the stays or anchors, serving thus to hold the base-plate and the clasps temporarily together. The operator then takes the usual plaster impression, as in ordinary practice. When the impression has set, it is carefully removed from the mouth, bringing the base-plate and clasps away with it *in situ* as an integral part thereof. Since the base-plate and clasps are retained with the impression, it is manifest that perfect accuracy in fit and arrangement is secured, these parts maintaining the same position as they will in the finished denture. A counter-model is then formed in the ordinary manner, the clasps coming away when the mold is parted and encircling the proper teeth of the model.

The parting of the mold without risk of breakage or distortion is better effected by reason of the wax coating upon the stay-plates, which allows the separation to freely occur. To avoid breakage, it is generally advisable to insert short upright wires in the impression of the teeth to be embraced by the clasps, so that subsequently on parting the counter-model the corresponding teeth thereon, encircled by the clasps, will be stiffened and be less apt to chip or break. Should the base-plate on parting remain with the impression, it can be easily removed therefrom and set in place upon the model without risk. The chief care is to insure exactness and nicety in the position of the clasps with relation to the teeth and to the base-plate, and this has already been secured by reason of the practice followed.

The base-plate and retaining-clasps being mounted upon the counter-model, the invention designs to secure these parts permanently by means of a fastening of vulcanite in lieu of a solder-joint, which had previously been customary. To this end the clasps (and teeth) of the dentures are first waxed in position, as usual. A double filling of soft rubber *c* is ordinarily laid on each side of the stays or anchors *b*, whereby the clasps are ultimately held in place upon the metal base.

To better insure the joint or union between the clasps and base-plate, the latter is furnished, as at *f*, in near proximity to the anchors projecting from the clasps, with supplemental anchors consisting of light metal strips soldered at about their middle to the base-plate. These have their ends bent slightly upward, or away from the base, to better allow for the flow of the softened rubber under and about them. By such expedient the rubber serves as a medium or interlock between the anchors of the clasps and the supplemental strips of the base-plate, both of which become firmly embedded in the rubber, and thus insure the desired union of the clasps to the base-plate. Obviously no more rubber need be used (nor indeed is it desirable) than may secure the necessary embedding of the anchors and strips, care being taken not to extend the rubber (if practicable) about the back parts of the margin of the base-plate opposite which the natural teeth come. Where teeth are set at intervals along the margin of the base-plate, the same expedient of a supplemental anchor or strip, as at *g*, projecting from the base-plate to engage with the rubber interlock, into which also the pins of the tooth or teeth extend, may be observed.

The several strips or supplemental anchors are secured to the base-plate at the outset, being light enough to allow for the easy swaging and shaping of the base, from which they are afterward bent upward at the ends, as already detailed.

The several parts being fitted and mounted in manner described, the subsequent manipulation—viz., vulcanizing, polishing, &c.—is pursued in the usual way as now commonly practiced. By reason of the use of clasps the base-plate is no longer dependent upon atmospheric pressure to hold it securely in place within the mouth. The plate can accordingly be more closely trimmed than would otherwise be feasible, thus contributing materially to the comfort of the patient. The trimming of the base-plate tends to render it more or less flexible or "springy," to avoid which difficulty it is expedient at times to thicken the plate, and thus increase its firmness in use. Under such circumstances my preference is to employ a base-plate comprising dual sheets of metal accurately fitted and united together. For such purpose the separate plates are stamped and shaped as usual and laid upon each other, one plate being slightly larger, so as to extend somewhat beyond the margin of the other. On applying solder to the margin of the plates and directing the flame of the blow-pipe against it the solder flows in between the plates, where a flux of borax, &c., has been previously laid, and on setting the solder unites the two plates firmly together. These may be then reswaged, if desired, to avoid the risk of distorted position which the use of solder and the strain thereof in setting may have developed. By such practice a plate of sufficient rigidity is obtained, which at the same time is of greater nicety in shape and fit than if formed from a single plate of double thickness.

Instead of using plaster in taking the impression, softened wax, modeling or impression compositions or the like may be substituted, although the use of such materials is attended with more risk of an imperfect and distorted impression and in other respects is less satisfactory than with the use of plaster, which on all accounts is to be preferred.

Having thus described my invention, what I claim as new, and desire to secure by Letters Patent, is—

1. The method of preparing partial dentures having a metal base-plate and retaining-clasps thereon, which method consists in fitting the clasps to the teeth in the mouth, mounting the previously-shaped base-plate in position therein, taking an impression with said plate and clasps *in situ*, removing the impression with the base-plate and clasps together, forming a counter-model and transferring the clasps thereto in parting the mold, applying soft rubber between the clasps and metal base, and vulcanizing, as usual, substantially as described.

2. As a new article of manufacture, partial dentures comprising a metal base-plate, metal retaining-clasps, and the intermediate uniting-vulcanite, substantially as described.

JOHN J. STEDMAN.

Witnesses:
FRANK E. OSBORN,
J. VENE DORLAND.